(12) United States Patent
Koivula

(10) Patent No.: US 6,248,246 B1
(45) Date of Patent: Jun. 19, 2001

(54) CONTINUOUS-ACTION FILTERING METHOD AND APPARATUS

(75) Inventor: Tuomo Koivula, Tampere (FI)

(73) Assignee: Parker Hannifin Oy, Vantaa (FI)

( * ) Notice: Subject to any disclaimer, the term of this patent is extended or adjusted under 35 U.S.C. 154(b) by 0 days.

(21) Appl. No.: 09/577,926

(22) Filed: May 24, 2000

Related U.S. Application Data

(63) Continuation of application No. PCT/FI99/00798, filed on Sep. 29, 1999.

(30) Foreign Application Priority Data

Sep. 30, 1998 (FI) .......................................................... 982113

(51) Int. Cl.⁷ .................................................. B01D 29/66
(52) U.S. Cl. .......................... 210/798; 210/340; 210/411; 210/425
(58) Field of Search ..................................... 210/340, 341, 210/411, 420, 424, 425, 426, 427, 791, 798

(56) References Cited

U.S. PATENT DOCUMENTS

| | | | |
|---|---|---|---|
| 1,189,077 | * 6/1916 | Elliott | 210/341 |
| 1,213,764 | * 1/1917 | Elliott | 210/341 |
| 1,699,680 | * 1/1929 | Sweetland | 210/411 |
| 3,598,243 | * 8/1971 | Gutkowski | 210/340 |
| 4,035,295 | 7/1977 | Pluequet . | |
| 4,256,583 | 3/1981 | Lennartz . | |
| 4,615,800 | 10/1986 | Stifelman et al. . | |
| 4,995,968 | 2/1991 | Snelling . | |

FOREIGN PATENT DOCUMENTS

| | | |
|---|---|---|
| 3215533 A1 | 10/1983 | (DE) . |
| 1 502 381 | 3/1974 | (GB) . |
| WO87/03213 | 11/1986 | (WO) . |
| WO92/07646 | 10/1991 | (WO) . |
| WO97/40916 | 4/1997 | (WO) . |
| WO00/18488 | 9/1999 | (WO) . |

* cited by examiner

*Primary Examiner*—Matthew O. Savage
(74) *Attorney, Agent, or Firm*—Christopher H. Hunter

(57) ABSTRACT

The invention relates to a continuous-action filtering method, a filtering apparatus, as well as to the use of the discussed apparatus, as an automatic filter in the fuel or lubrication system of an engine. According to the invention, the apparatus comprises three filtering units, having a common inlet channel for a flow to be filtered, a common outlet channel for a filtered flow, as well as a common valve element provided with flow connections for controlling the flow in such a manner that the filtering units are in operation one at a time. An essential feature in the operation of the valve element is its ability to rotate around its axis and, furthermore, its ability to move between two different positions, the two filter units being operable alternately by rotating the valve element and the third filtering unit being operable by moving the valve. The valve element is constituted, e.g., by a cylindrical, axially movable spindle, which is also rotatable around its axis. In an automatic filter, the two filtering units can be used for a normal filtering process, wherein, with one of the units in operation at a given time, the other is subjected to a backflush, and the third unit is set in operation as said two units are being serviced.

13 Claims, 5 Drawing Sheets

CONTINUOUS-ACTION FILTERING METHOD AND APPARATUS

CROSS REFERENCE TO RELATED APPLICATION

This application is a continuation of copending International Application No. PCTFI99/00798, filed Sep. 29, 1999, which designated the United States, and which claims priority to Finish patent application Ser. No. 982,113, filed Sep. 30, 1998.

FIELD OF THE INVENTION

The present invention relates to a filtering apparatus, comprising a plurality of parallel-connected filtering units, having a common inlet channel for a flow to be filtered, a common outlet channel for a filtered flow, as well as a common, movable valve element provided with flow connections attachable to the inlet and outlet flow channels for directing the flow to the filtering units for activating the filtering units one by one. The invention further relates to the use of such a filtering apparatus in an engine as an automatic filter for filtering fuel and lubricant, as well as to a continuous-action filtering method applying the apparatus.

U.S. Pat. No. 4,256,583 describes a filter apparatus, comprising a rotary valve for directing a flow to be filtered alternately into two parallel filter chambers. In addition, the apparatus includes means for cleaning the filter chambers with a backflush between filtering cycles. Thus, the apparatus is a continuous-action unit and intended to be self-cleaning in order to avoid the necessity of replacing the filter elements present in the chambers.

The most important application for automatic filters, of which the U.S. Pat. No. 4,256,583 is one example, comprises fuel and lubrication systems in diesel engines, wherein filtering is used for removing mostly solid, engine-wearing impurities. Despite repeated flushings, the filtering capacity of automatic filters nonetheless deteriorates in time as a result of wear and contamination of filter elements, which manifests itself as a shorter interval between flushings, i.e. an increased need for flushing. At some point, the filter elements must be replaced with new ones and, e.g. in the diesel engines of ships, this must be done with no interruption of filtration. The inconvenience of service is a problem in presently available automatic filters, since the successive operating cycles of filtering chambers or the like filtering units are too short for the replacement of filter elements therebetween, particularly if the cycles have become shorter by the time the replacement of elements becomes necessary.

This problem has been addressed by using a separate backup filter for directing the flow to be filtered thereto while the actual filtering units of an apparatus are being serviced. However, such an extra-apparatus solution, which requires separate flow control valves and channels, is bulky and impractical.

SUMMARY OF THE INVENTION

An object of the present invention is to provide a filtering apparatus, wherein it is possible to direct a flow to be filtered to various filtering units, such that servicing the units becomes easier and is possible to carry out within the framework of a structurally compact and integral apparatus. A filtering apparatus of the invention is characterized in that it comprises three filtering units, that a valve element is adapted to rotate around its axis and furthermore to move between two different positions, and that the valve element is provided with inlet and outlet connections for two filtering units for operating the units alternately by rotating the valve element, as well as with inlet and outlet connections for a third filtering unit which can be set in operation by moving the valve element.

Thus, the filtering apparatus of the present invention includes two filtering units which, in a normal operation of the apparatus, are able to take care of filtering and whose operation preferably consists of alternating filtering and flushing cycles controlled by a valve element. Hence, the third filtering unit of the apparatus constitutes a backup unit, to which a flow to be filtered can be directed as the two first-mentioned units are being serviced. According to the invention, the third unit is integrated as a structural part of the filtering apparatus and its operation is controlled by the same valve element as the other two filtering units of the apparatus. The third filtering unit can be provided with a filter element, which is clean, has a large filtering surface and a capacity which is sufficient for the duration of servicing the other two units, such as for the replacement of filter elements included therein. As the filtering process then continues with serviced filtering units, it is possible to replace the soiled filter element of the third filtering unit to make it ready for action for the next servicing period of the regular filtering units.

In accordance with the present invention, the actions required of a valve element are performed by a spindle with a preferably circular cross-section, which is both movable in the direction of its longitudinal axis and rotatable around its longitudinal axis, the actions being independent of each other. The spindle may be provided with flow deflecting ports located in a plane normal to its axial direction or with recesses bounded by the side of the spindle, which function as common inlet and outlet connections for the two filtering units normally used in the apparatus. By rotating the spindle, the flow can be preferably directed alternately to these units through the same flow connections. On the other hand, the inlet and outlet connections for the third filtering unit may be constituted by ports extending directly through the spindle in a plane normal to the spindle axis. These are positioned in the spindle alongside the inlet and outlet connections for the other two filtering units and are coupled with inlet and outlet channels common to the filtering units of the apparatus by moving the spindle in the axial direction and possibly by rotating it at the same time.

The operation of the two filtering units normally employed in the apparatus is based on alternating filtering and cleaning cycles in each unit. Cleaning is preferably effected by a backflush, the filtering units being thus provided with channels for delivering a flushing medium as well as for discharging a fluid contained in the unit at the start of a flushing, any loose impurities, as well as the flushing medium. The third filtering unit can preferably employ filter elements that are replaceable, disposable, or cleanable at the time of a replacement, whereby this unit does not require any flushing channels.

The invention comprises particularly the use of a filtering apparatus as described above in engines, such as diesel engines for ships, as an automatic filter for filtering fuel or lubricant. However, the apparatus is good for other applications as well, e.g., in power plants and in paper and process industries.

In a filtering method of the invention, a flow is filtered in continuous action by using alternately a plurality of filtering units, having a common inlet channel for a flow to be filtered, a common outlet channel for a filtered flow, as well as a common, movable valve element provided with flow connections to be coupled with the inlet and outlet flow channels for directing the flow to pass through the filtering units, such that the units are in operation one at a time. The method is characterized in that it employs two filtering units provided with preferably common inlet and outlet connections included in the valve element, by directing a flow to the units alternately by rotating the valve element around its axis, and that the flow is occasionally directed, by moving the valve element, to a third filtering unit, the valve element being provided with separate inlet and outlet connections therefor.

It is preferable that the filtering process is based on the two alternately used filtering units discussed above, as far as its operation is concerned. It is during any given operating cycle of one filtering unit that the other unit is subjected to cleaning, which is performed preferably by a compressed-air driven backflush. The third filtering unit constitutes a backup unit, which is primarily used during the replacement of filter elements in the other two units, or other such service procedures.

Further features of the present invention will become apparent to those skilled in the art upon reviewing the following specification and attached drawings.

DETAILED DESCRIPTION OF THE PREFERRED EMBODIMENT

Figure 1:
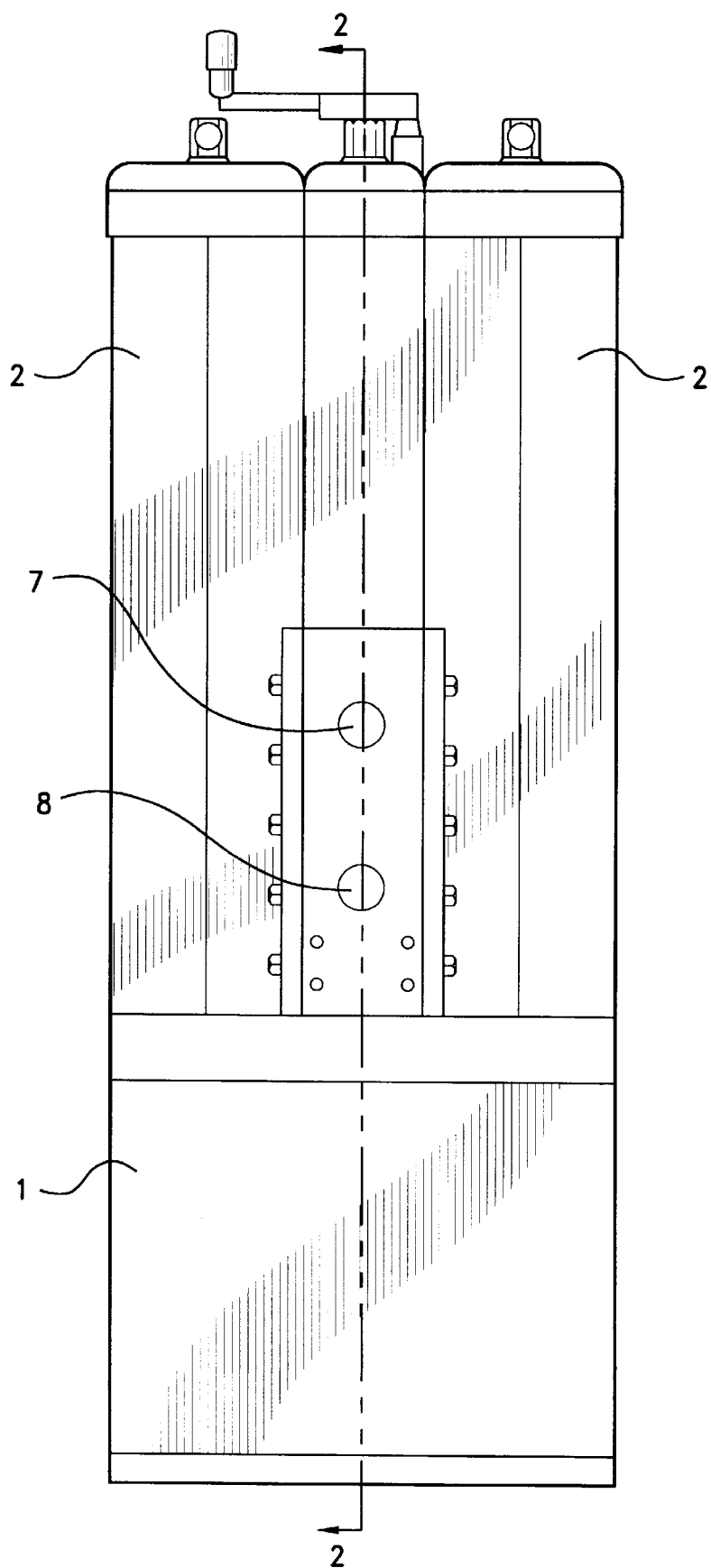
FIG. 1 shows one continuous-action filtering apparatus of the invention in a front view.

The drawings illustrate a continuous-action filtering apparatus, which functions as an automatic filter, e.g., in the fuel and lubrication system of a diesel engine. The apparatus comprises a stand 1 as well as two parallel filtering units 2, each having its filter chamber 3 provided with eight circumferentially arranged candle-like filter elements 4 which can be made of metal or plastic mesh. The apparatus has its normal operation based on the alternating filtering and flushing cycles of these two filtering units 2.

The apparatus further includes a third filtering unit 5, which is provided with a single star-pleated filter element 6 of metal or plastic mesh. The third filtering unit 6 is intended for use while the other two filtering units 2 are being serviced.

Figure 4:
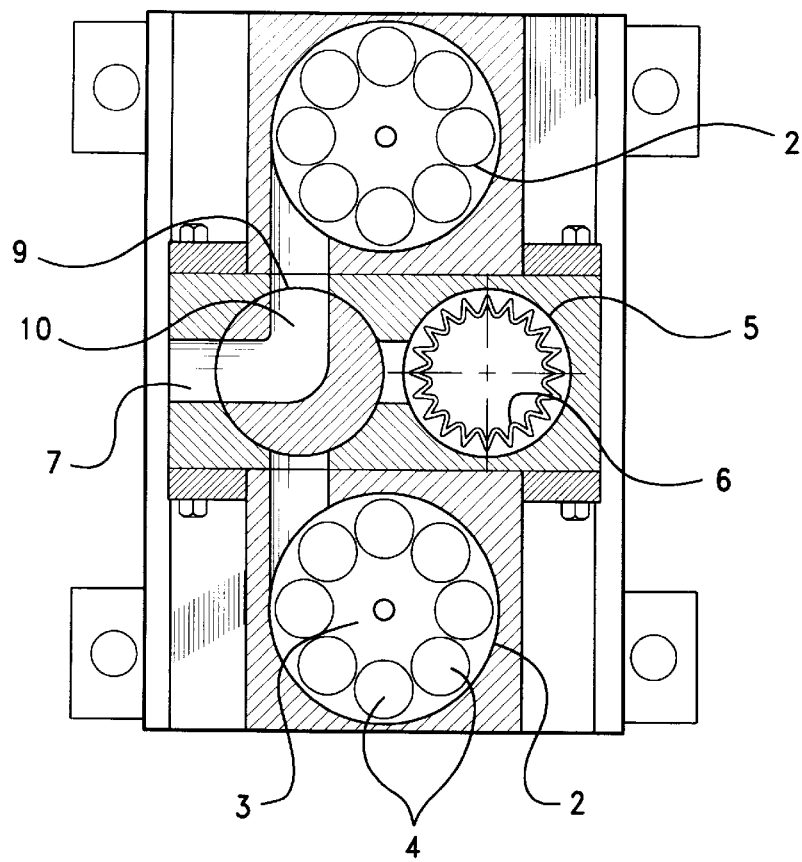
FIG. 4 is a horizontal section 4—4 in FIG. 2.

The apparatus includes an inlet channel 7 for a flow to be filtered, as well as an outlet channel 8 for a filtered flow, these being common to all three filtering units 2, 5 of the apparatus. The flow control is taken care of by a cylindrical spindle 9 movable in the direction of its longitudinal axis and rotatable around the discussed axis, which is provided with flow connections 10–13 arranged between the filtering units 2, 5 and the inlet and outlet flow channels 7, 8 in such a way that the filtering units are operative one at a time. Hence, the spindle 9 is provided with an inlet flow connection 10 common to two filtering units 2, which is constituted by a curving port present in a plane normal to the spindle axis (horizontal plane). The port 10 functioning as an inlet connection imparts a 90° deflection to a flow to be filtered passing from the inlet channel 7 to the filtering unit 2, as depicted in FIG. 4. It can also be seen that, by turning the spindle 9 counterclockwise through 90°, the port 10 shifts to direct the flow to the second of the parallel filtering units 2. Respectively, the outlet connection 11 common to the parallel filtering units 2 is constituted by a similar curving port made in the spindle 9. The inlet and outlet connections 10, 11 are at any given time open to the same filtering unit 2 at the same time. The inlet connection 10 directs the flow to be filtered from the inlet channel 7 into the filter chamber 3 of the filtering unit 2, wherein the flow is filtered into the interior of the candle-like filter elements 4, progresses then into a space 14 underneath the filter chamber, and ultimately through the outlet connection 11 of the spindle into the outlet channel 8.

Figure 2:
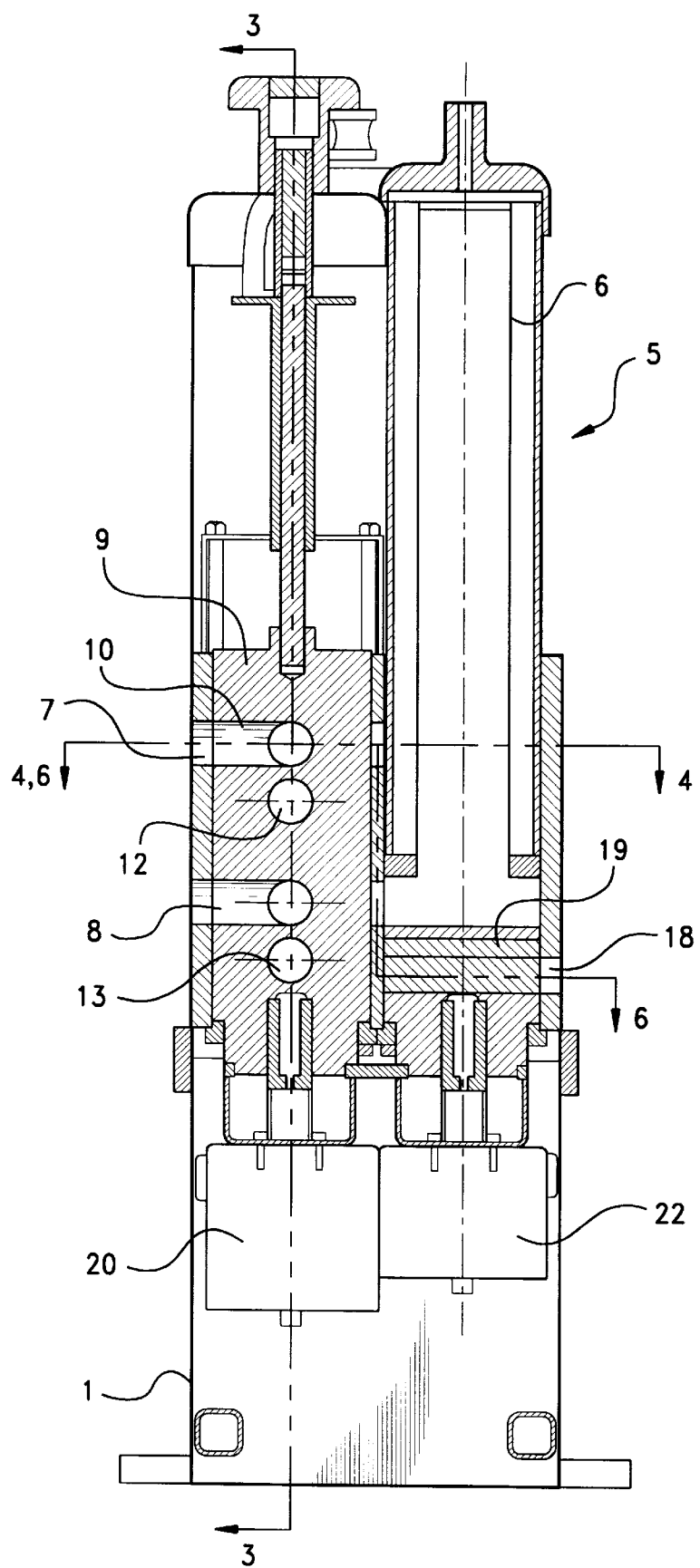
FIG. 2 is a vertical section 2—2 in FIG. 1, showing a spindle, constituting a valve element in the apparatus, in its bottom position for operating two parallel filtering units.
Figure 3:
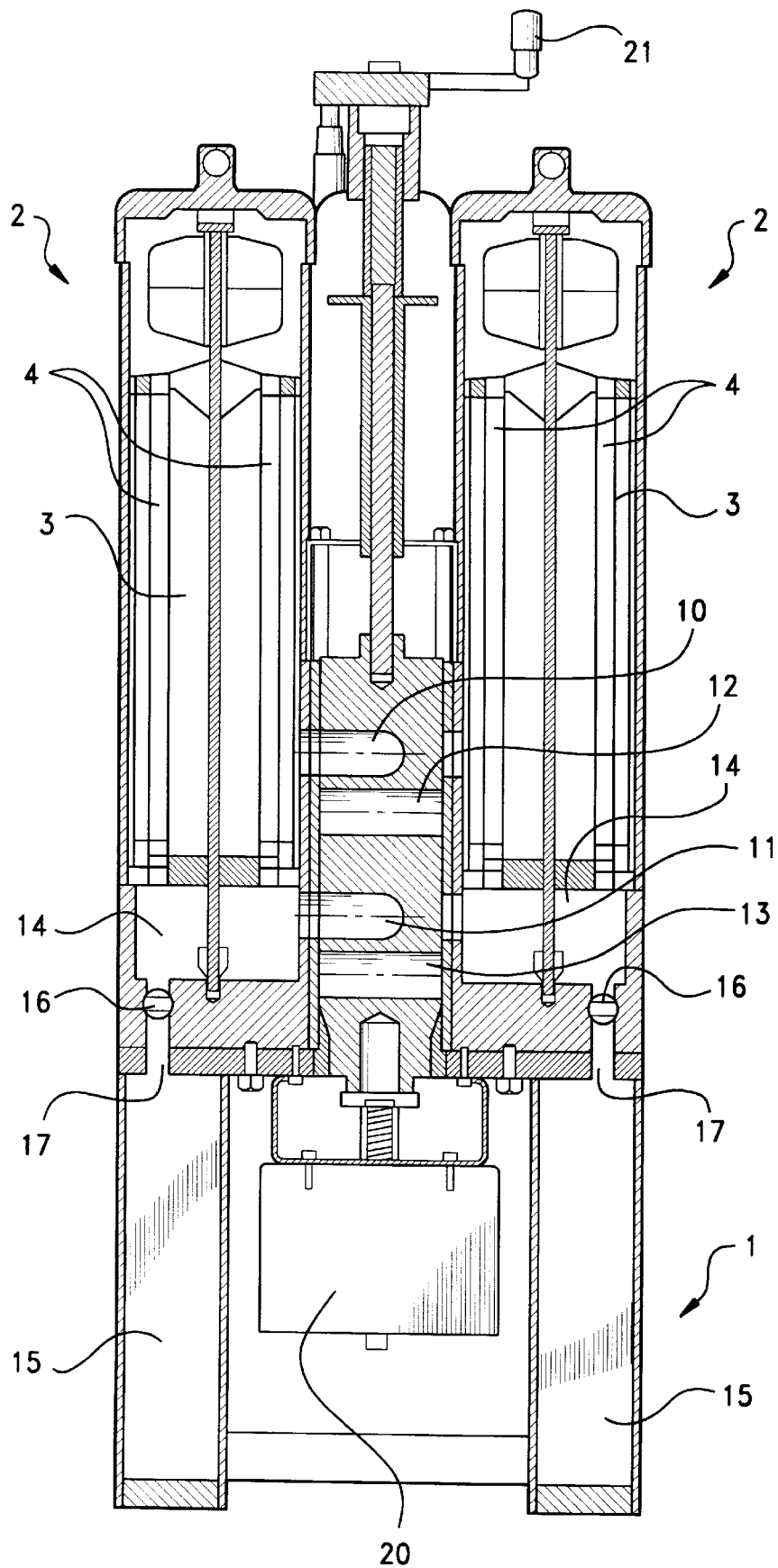
FIG. 3 is a vertical section 3—3 in FIG. 2, showing the spindle position between the two filtering units.
Figure 5:
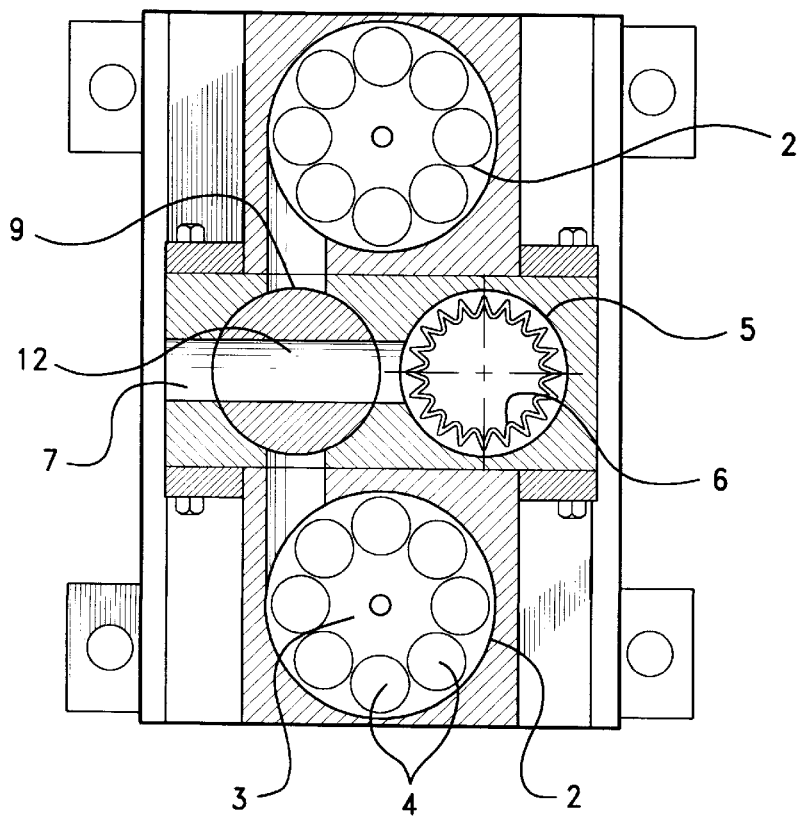
FIG. 5 is a section similar to FIG. 4, but shows the direction of a flow to a third filtering unit with the spindle lifted to its top position, and FIG. 6 consists of schematic sectional views A–F, matching the section 6—6 in FIG. 2 and showing sequentially a filtering process occurring in the apparatus, wherein the rotary spindles control alternating filtering and flushing cycles for two parallel filtering units.

The third filtering unit 5, which according to FIGS. 4 and 5 lies directly opposite to the inlet flow channel 7, has an inlet connection 12 which is constituted by a port extending through the spindle 9 in the direction of its diameter. In order to direct the flow to be filtered to the third filtering unit 5, the spindle 9 is lifted and simultaneously rotated from the position of FIGS. 2–4 in such a way that the inlet connection 12 is set level with the inlet channel 7 to provide a direct extension therefor, as shown in FIG. 5. An outlet flow connection 13 is constituted by a similar port extending through the spindle 9, which lines up with the outlet flow channel 8 upon moving the spindle. Thus, the flow to be filtered travels from the inlet channel 7 through the inlet connection 12 to the filtering unit 5, wherein it filters into the pleated filter element 6 and discharges through the bottom end of the unit and the outlet connection 13 into the outlet channel 8 while the flow connections 10 and 11 to the other two filtering units 2 of the apparatus are closed.

As pointed out above, the apparatus has its normal operation based on the alternation of filtering and flushing cycles in two parallel filtering units 2. During a flushing cycle, the spindle 9 is in a rotary position which denies the flow to be filtered an access to the filtering unit being flushed. The flushing is effected by compressed air which is delivered to the filtering units 2 from compressed-air tanks 15 included in the stand 1 of the apparatus. These are in communication by way of ducts 17 provided with shut-off valves 16 with the spaces 14 underneath the filtering units, from which the air has an access into the candle elements 4 and through the housing thereof into the filter chamber 3 outside the elements as a counter-flow with respect to the filtering flow. At the start of a flushing cycle, the filtering unit 2 is full of fluid which is propelled by the incoming compressed air into a waste channel 18, whose opening and closing is regulated by a rotatable waste spindle 19 set below the third filtering unit 5 and illustrated, e.g., in FIG. 2.

In the embodiment shown in the drawings, the third filtering unit 5 is not provided with a backflush as described above but, after the unit has completed its operating cycle, its layered filter element 6 is replaced. The element, which is made e.g. of metal mesh, can nonetheless be cleanable by washing or by using ultrasound, whereafter it can be used again.

The spindle 9 is set in its axial, vertical motions, as well as in its rotary motions, by using a pneumatic actuator 20 set underneath the spindle. In addition, the spindle 9 is fitted with a manually operated lever 21, whereby it is possible to work the spindle for controlling the flows during possible power failures. Rotating the waste spindle 19, used for regulating the discharge flows in flushing cycles, is effected by means of a separate pneumatic actuator 22.

Figure 6:
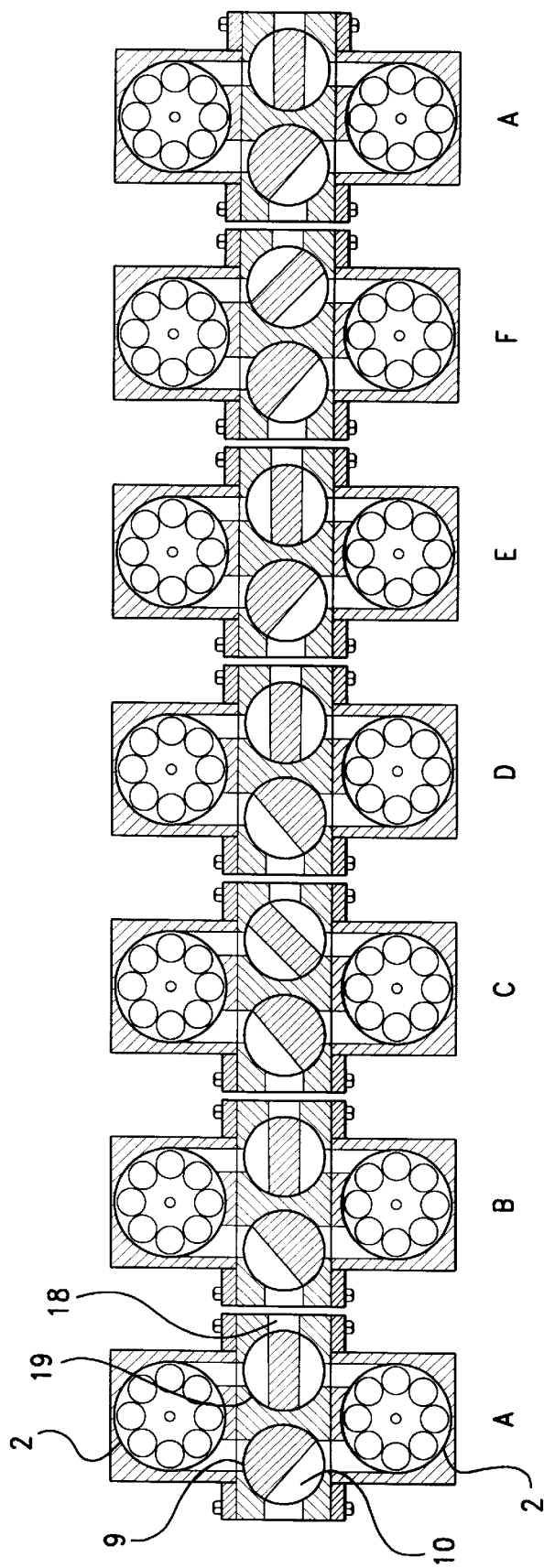

The operating sequences of the apparatus for a normal filtering process are depicted in FIG. 6. The figures showing various sequences A–F are otherwise consistent with what is shown in FIGS. 1–5, except that the inlet connection 10 for a flow towards the filtering units 2 is shown here, not as a curving port but as a horizontal, circular-segment shaped recess made in the side of the spindle.

In a starting position "A" shown in FIG. 6, the flow to be filtered is guided from the inlet channel 7 to the right-hand filtering unit 2. At the same time, there is a flow path open from the right-hand filtering unit 2 through the outlet connection 11 to the outlet flow channel 8. The spindle 9 closes a flow path to the left-hand filtering unit 2, as well as to the third filtering unit 5, and the waste spindle 19 closes flow paths from the filtering units 2 to the waste channel 18. The filtering sequence "A" may have a duration of, e.g., two hours, or the sequence may continue until the pressure difference across the filter has exceeded a set value. The sequence is finished as the spindle 9 rotates through 90° clockwise to shut off the flow paths to the right-hand filtering unit and to open the same to the left-hand unit, as depicted in position "B" in FIG. 6. After a set period of time, which may be, e.g., 1 minute, the waste spindle 19 rotates through 45° to open a flow communication from the right-hand filtering unit to the waste channel 18, as shown in position "C". At the same time, the compressed-air valve 16 (see FIG. 3) to the right-hand filtering unit opens and the compressed air propels the fluid contained in the filtering chamber into the waste channel 18 and cleans the filter elements 4 with a backflush. The flushing may have a duration of, e.g., 10 seconds, whereafter the waste spindle 19 rotates back to the position to shut off connections to the waste channel 18, as shown in position "D". At the same time, the filtering sequence initiated in the left-hand filtering unit 2 continues for a set time, or until the pressure difference exceeds a set value. At this point, the spindle 9 rotates through 90° counter-clockwise to close the flow paths to the left-hand filtering unit and to re-open the same to the right-hand one, as shown in position "E". The filtering process continues then in the right-hand filtering unit while the left-hand unit is cleaned with a backflush, wherein the waste spindle 19, as shown in position "F", opens a flow path to the waste channel 19 and activates the supply of compressed air. At the end of flushing, the waste spindle 19 returns to its shut-off position, the sequence having returned to the starting position "A". The filtering continues nonstop as described until, due to the service requirement of the filtering units 2, the flow is directed to pass through the third filtering unit 5 by axially moving the spindle 9. After service operations, such as the cleaning or replacement of the candle-like filter elements 4, the action returns to the serviced filtering units 2 and continues in accordance with the described sequences.

It is obvious for a skilled person that various applications of the invention are not limited to what is set forth above as an example but may vary within the scope of the annexed claims. Thus, although the above description deals with two alternately operated filtering units 2, as well as with the third filtering unit 5 to be operated as the other two are being serviced, these units must be conceived as a minimum required by the invention, i.e., the number of parallel-connected filtering units may be higher than this. Neither does the invention require that the filter element 6 used in the third filtering unit 5 be necessarily disposable or should be replaced after each operating cycle but, if desired, the third filtering unit can also be provided with a backflush similar to what is used in the other two filtering units 2.

Nor is it necessary that the flow to and from the parallel filtering units 2 be effected through the same inlet and outlet connections 10, 11, but the spindle may be provided in the same horizontal plane with several separate and parallel connections which, by rotating the spindle, can be brought to establish a communication between the inlet channel 7 and the filtering units. The solutions depend on the dimensions, as well as on the relative disposition of the filtering units, spindle, and channels, which may vary in each individual case.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filtering apparatus, comprising a plurality of parallel-connected filtering units having a common inlet channel for a flow to be filtered, a common outlet channel for a filtered flow, and a common movable valve element provided with flow connections fluidly connectable to the inlet and outlet flow channels for directing the flow to be filtered to the filtering units and for activating the filtering units one by one, the apparatus including three filtering units, and the valve being configured and arranged to be rotatable around its longitudinal axis and axially movable along said longitudinal axis between two different axial positions, wherein the valve element is provided with inlet and outlet connections for a first and a second of the filtering units for operating the first and second filtering units alternately by rotating the valve element in one of the axial postions, the valve element also including inlet and outlet connections for a third filtering unit which can be set in operation by axially moving the valve element to the other axial position.

2. The filtering apparatus as set forth in claim 1, wherein the valve element comprises a cross-sectionally circular spindle coaxially surrounding said longitudinal axis.

3. The filtering apparatus as set forth in claim 2, wherein the spindle includes flow deflecting ports extending in a plane normal to the axis of the spindle, said ports functioning as the inlet and outlet connections of the valve element for the first and second filtering units and which are operable alternately by rotating the spindle.

4. The filtering apparatus as set forth in claim 3, wherein the inlet and outlet connections for the third filtering unit comprise ports extending directly through the spindle in a plane normal to the axis of the spindle.

5. The filtering apparatus as set forth in claim 4, wherein said first and second filtering units are fitted with channels for cleaning filter elements housed by the units by means of a backflush.

6. The filtering apparatus as set forth in claim 3, wherein the inlet and outlet connections for the third filtering unit comprise ports extending directly through the spindle in a plane normal to the axis of the spindle.

7. The filtering apparatus as set forth in claim 3, wherein said first and second filtering units are fitted with channels for cleaning filter elements housed by the units by means of a backflush.

8. The filtering apparatus as set forth in claim 2, wherein the inlet and outlet connections for the third filtering unit comprise ports extending directly through the spindle in a plane normal to the axis of the spindle.

9. The filtering apparatus as set forth in claim 8, wherein the third filtering unit houses one or more replaceable filter elements.

10. A method for filtering a flow in continuous action comprising the steps of: providing a plurality of filtering units having a common inlet channel for a flow to be filtered, a common outlet channel for a filtered flow, a common, movable valve element provided with flow connection attachable to the inlet and outlet flow channels for directing the flow to pass through the filtering units for having the filtering units in operation one at a time, wherein the valve element is configured and arranged to be rotatable around its longitudinal axis and axially movable along said longitudinal axis between two different axial positions, wherein two filtering units are provided with common inlet and outlet connections included in the valve element, directing said flow to the two filtering units alternately by rotating the valve element around its longitudinal axis in one of the axial positions, directing said flow by moving the valve element axially along said longitudinal axis the other axial position, to a third filtering unit, and providing the valve element with separate inlet and outlet connections for the third filtering unit.

11. The method as set forth in claim 10, including controlling the flow by means of a cross-sectionally circular spindle functioning as the valve element, by rotating the spindle around its longitudinal axis, as well as by moving the spindle in the direction of its longitudinal axis.

12. The method as set forth in claim 11, including operating one of the two filtering units and cleaning the other of the two filtering units by a backflush, or operating the third filtering unit during the service or replacement of the other two filtering units.

13. The method as set forth in claim 10, including operating one of the two filtering units and cleaning the other of the two filtering units by a backflush, or operating the third filtering unit during the service or replacement of the other two filtering units.

* * * * *